United States Patent
Deng et al.

(10) Patent No.: US 11,042,391 B2
(45) Date of Patent: *Jun. 22, 2021

(54) REPLAYING OPERATIONS ON WIDGETS IN A GRAPHICAL USER INTERFACE

(71) Applicant: INTERNATIONAL BUSINESS MACHINES CORPORATION, Armonk, NY (US)

(72) Inventors: Xue Mei D Deng, Beijing (CN); Jun Hong Zhao, Beijing (CN); Ang Yi, Beijing (CN); Lu LL Huang, Beijing (CN); Hui Huang, Beijing (CN); Ya Juan Tong, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,095

(22) Filed: Jul. 3, 2019

(65) Prior Publication Data

US 2020/0356395 A1 Nov. 12, 2020

Related U.S. Application Data

(63) Continuation of application No. 16/405,110, filed on May 7, 2019.

(51) Int. Cl.
*G06F 9/455* (2018.01)
*G06F 9/451* (2018.01)

(52) U.S. Cl.
CPC .......... *G06F 9/45512* (2013.01); *G06F 9/451* (2018.02)

(58) Field of Classification Search
CPC .......................... G06F 9/45512; G06F 9/4551
USPC ................................................... 717/101–119
See application file for complete search history.

(56) References Cited

U.S. PATENT DOCUMENTS

| 6,529,215 | B2 | 3/2003 | Golovchinsky | |
| 6,871,327 | B2* | 3/2005 | Polk ....................... | G06F 9/451 715/856 |
| 8,397,186 | B2* | 3/2013 | Brubaker ................ | G06F 9/451 716/106 |
| 8,621,431 | B2* | 12/2013 | Zhao ....................... | G06F 9/454 717/113 |
| 2004/0153837 | A1 | 8/2004 | Preston | |

(Continued)

OTHER PUBLICATIONS

Thomas, Bruce H., and Paul Calder. "Applying cartoon animation techniques to graphical user interfaces." ACM Transactions on Computer-Human Interaction (TOCHI) 8.3 (2001): pp. 198-222. (Year: 2001).*

(Continued)

*Primary Examiner* — Satish Rampuria
(74) *Attorney, Agent, or Firm* — David Spalding

(57) ABSTRACT

A method for replaying operations on a widget in a graphical user interface (GUI) includes acquiring, from an operation record, operation information related to the widget and a first unique identification (UID) of the widget. A widget having a second UID is determined, wherein the second UID is generated based on a call stack for creating the widget in the GUI. The second UID is the same as the first UID. It may be determined whether the widget on the GUI is operable. An operation is executed on the widget according to the operation information related to the widget.

8 Claims, 6 Drawing Sheets

(56) References Cited

U.S. PATENT DOCUMENTS

| | | |
|---|---|---|
| 2007/0169085 A1 | 7/2007 | Griep |
| 2011/0173239 A1* | 7/2011 | Sayed ................ G06F 11/3414 707/821 |
| 2012/0159453 A1* | 6/2012 | Zhao ...................... G06F 9/454 717/127 |
| 2015/0220312 A1 | 8/2015 | Jemiolo |
| 2018/0197123 A1 | 7/2018 | Parimelazhagan |

OTHER PUBLICATIONS

Shirogane, Junko, and Yoshiaki Fukazawa. "Correspondence validation method for GUI operations and scenarios by operation history analysis." Proceedings of the 13th international conference on Intelligent user interfaces. 2008.pp. 257-266 (Year: 2008).*

Kishi, Nobuko. "Analysis tool for skill acquisition with graphical user interfaces based on operation logging." Advances in Human Factors/Ergonomics. vol. 20. Elsevier, 1995. pp. 161-166. (Year: 1995).*

Xie, Qing, and Atif M. Memon. "Designing and comparing automated test oracles for GUI-based software applications." ACM Transactions on Software Engineering and Methodology (TOSEM) 16.1 (2007): pp. 1-36 (Year: 2007).*

Reid, Andrew CE, et al. "Systematic Testing of a GTK Graphical User Interface."; 2008, pp. 1-21 (Year: 2008).*

Ganov, Svetoslav, et al. "Barad-a GUI testing framework based on symbolic execution." Laboratory of Experimental Software Engineering, University of Texas at Austin Software Testing and Verification Group (2009).pp. 1-11 (Year: 2009).*

IBM, List of IBM Patents or Patent Applications Treated as Related, Appendix P, dated , 2 pages.

IBM, List of IBM Patents or Patent Applications Treated as Related, Appendix P, dated Jun. 1, 2020, 2 pages.

Pending U.S. Appl. No. 16/405,110, filed May 7, 2019, entitled: "Replaying Operations on Widgets in a Graphical User Interface".

IBM "Considerations for IBM Robotic Process Automation With Automation Anywhere", https:/www.ibm.com/support/knowledgecenter/mk/SSFPJS_8.6.0/com.ibm.wbpm.wle.editor.doc/topics/cviews.html, IBM Knowledge Center—Coach Views, Sep. 13, 2018, pp. 1-6.

Mell et al., "The NIST Definition of Cloud Computing", National Institute of Standards and Technology, Special Publication 800-145, Sep. 2011, pp. 1-7.

Savinkin, "UIPATH—Robotic Process Automation Software", http://scraping.pro/uipath-robotic-process-automation-software/, Sep. 13, 2018, pp. 1-5.

Asif, Muhammad, Shikharesh Majumdar, and Raluca Dragnea. "Partitioning the WS execution environment for hosting mobile web services." 2008 IEEE International Conference on Services Computing. vol. 2. IEEE, 2008. pp. 315-322 (Year: 2008).

Chafle, Girish B., et al. "Decentralized orchestration of composite web services." Proceedings of the 13th international World Wide Web conference on Alternate track papers & posters. 2004. pp. 134-143 (Year: 2004).

Thomson, Alexander, et al. "Calvin: fast distributed transactions for partitioned database systems." Proceedings of the 2012 ACM SIGMOD International Conference on Management of Data. 2012. pp. 1-12 (Year: 2012).

* cited by examiner

REPLAYING OPERATIONS ON WIDGETS IN A GRAPHICAL USER INTERFACE

BACKGROUND

Embodiments of the present invention relate to graphical user interfaces, and more specifically, to methods, systems and computer program products for replaying the operations on widgets in a graphical user interface.

Robotic Process Automation (RPA) is the technology that allows a user to configure computer software, or a software "robot," to emulate and integrate actions of a user interacting with a digital system, such as via a graphical user interface (GUI), to perform a process. An RPA robot can use the GUI to capture data, manipulate applications, and otherwise perform the process just like the user does. The RPA robot can interpret, trigger responses, and communicate with other systems in order to perform a vast variety of repetitive tasks.

BRIEF SUMMARY

Embodiments of the present invention are directed to a method, a system and computer program product. According to one embodiment, operation information related to a widget and a first unique identification (UID) of the widget are required from an operation record. A widget having a second UID is determined. The second UID is generated based on a call stack for creating the widget in the GUI during a replaying process. The second UID is the same as the first UID. It is determined whether the widget on the GUI is operable. An operation is executed on the widget according to the operation information related to the widget, which may be in response to the widget being operable.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Figures 1, 2:
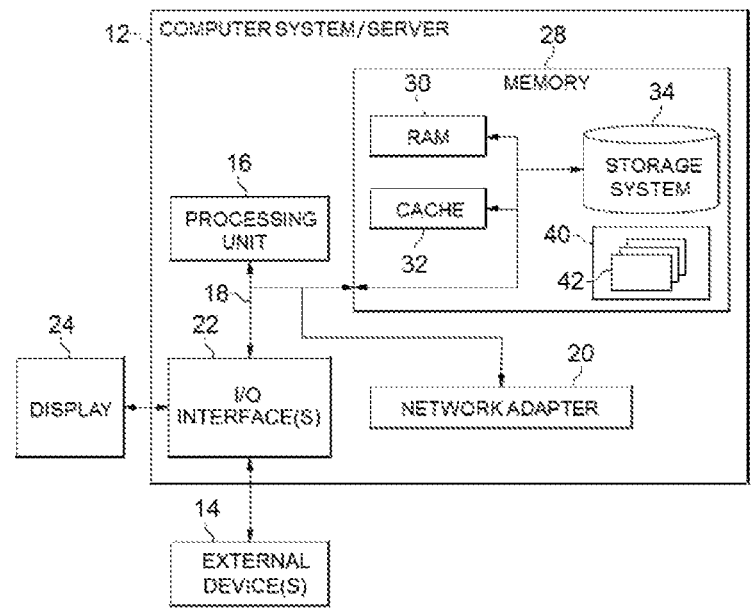
FIG. 1 depicts a cloud computing node according to an embodiment of the present invention.
FIG. 2 depicts a cloud computing environment according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
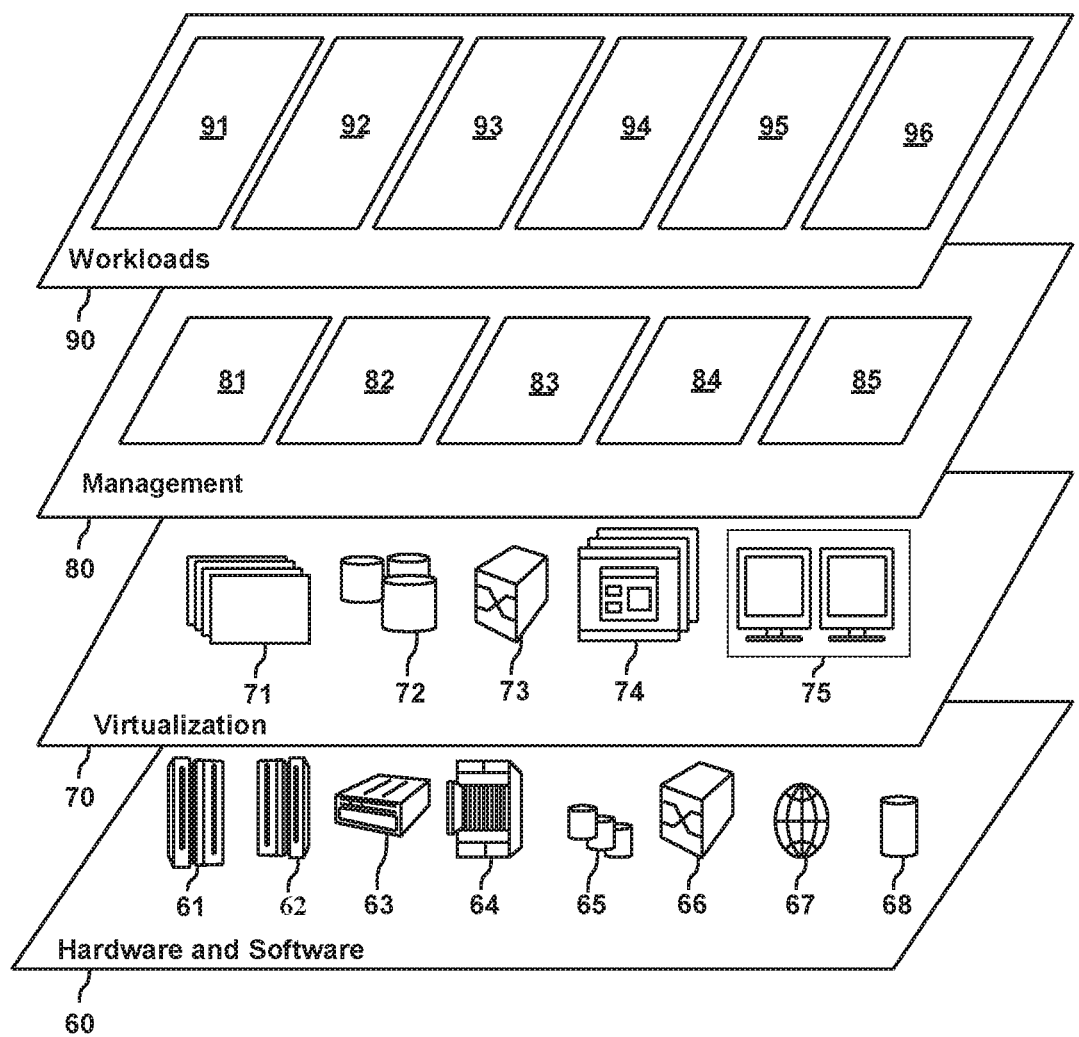
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and Robotic Process Automation (RPA) system 96.

An RPA system can replay operations on a plurality of widgets (control elements, e.g., button, check box, label, scroll bar, drop-down list, icon, link, and the like) in a graphical user interface (GUI) during a replaying process. So it is necessary to identify each widget in the GUI. In a traditional way, a widget in the GUI can be identified based on one or more attribute values of the widget such as name, class etc. Some widgets don't have the attribute value(s), so it is difficult to meet unique and consistent requirements of identifying a plurality of widgets in the GUI. Moreover, developers of the RPA system normally have no permission to change the source code of the GUI. In another way, a widget in the GUI can be identified based on the location of the widget in the GUI. However, the widget can't be accurately located if resolution of a screen of the GUI has been changed during the replaying process.

Therefore, it's desirable to provide a solution to precisely identify each widget of the plurality of widgets in a GUI when replaying the operations on a plurality of widgets. According to embodiments of the present disclosure, a new solution is proposed to identify a widget in the GUI by a unique identification (UID) of the widget generated based on a call stack for creating the widget in both a recording process and the replaying process. For the widget, since a UID generation strategy adopted in the replaying process is the same as that in the recording process, so the UID of the widget generated in the replaying process is the same as that generated in the recording process. With the UID of the widget, the widget can be accurately identified during the replaying process.

Figure 4:
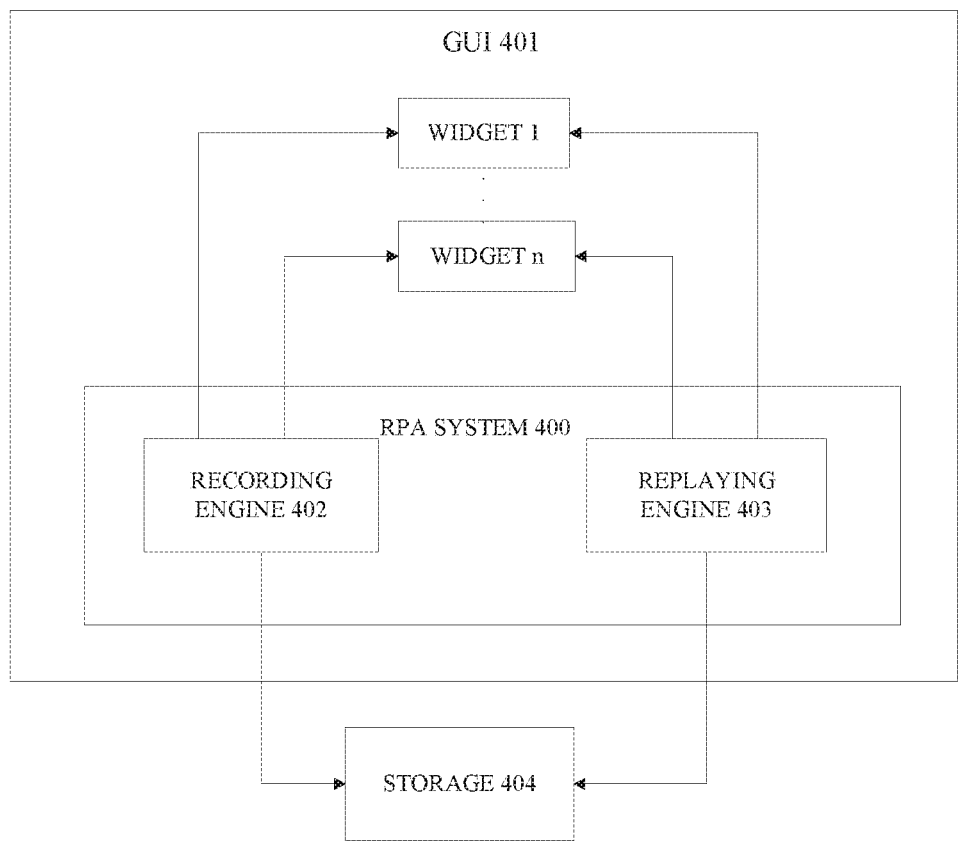
FIG. 4 depicts a RPA system according to an embodiment of the present invention.

With reference now to FIG. 4, a RPA system 400 according to an embodiment of the present disclosure is depicted. The RPA system 400 may include a recording engine 402 and a replaying engine 403. The recording engine 402 and the replaying engine 403 can be integrated with a graphical user interface (GUI) 401 in a browser. The recording engine 402 and the replaying engine 403 can also be implemented as a plugin in a browser. The GUI 401 is a user interface that allows users to interact with electronic devices through graphical icons and visual widgets, instead of text-based user interfaces, typed command labels or text navigation. The recording engine 402 can record operations on a plurality of widgets in the GUI 401 and store operation information related to the plurality of widgets as operation records in the storage 404. After acquiring the operation records from the storage 404, the replaying engine 403 can enable a browser to replay the operations on a plurality of widgets in the GUI 401. Although the recording engine 402 and the replaying engine 403 are illustrated in the same block 400 in FIG. 4, those skilled in the art may understand that the recording engine 402 and the replaying engine 403 can be implemented in a same server or in different servers in a distributed system. The recording process and the replaying process will be described respectively by referring to the RPA system 400 in FIG. 4.

Figure 5:
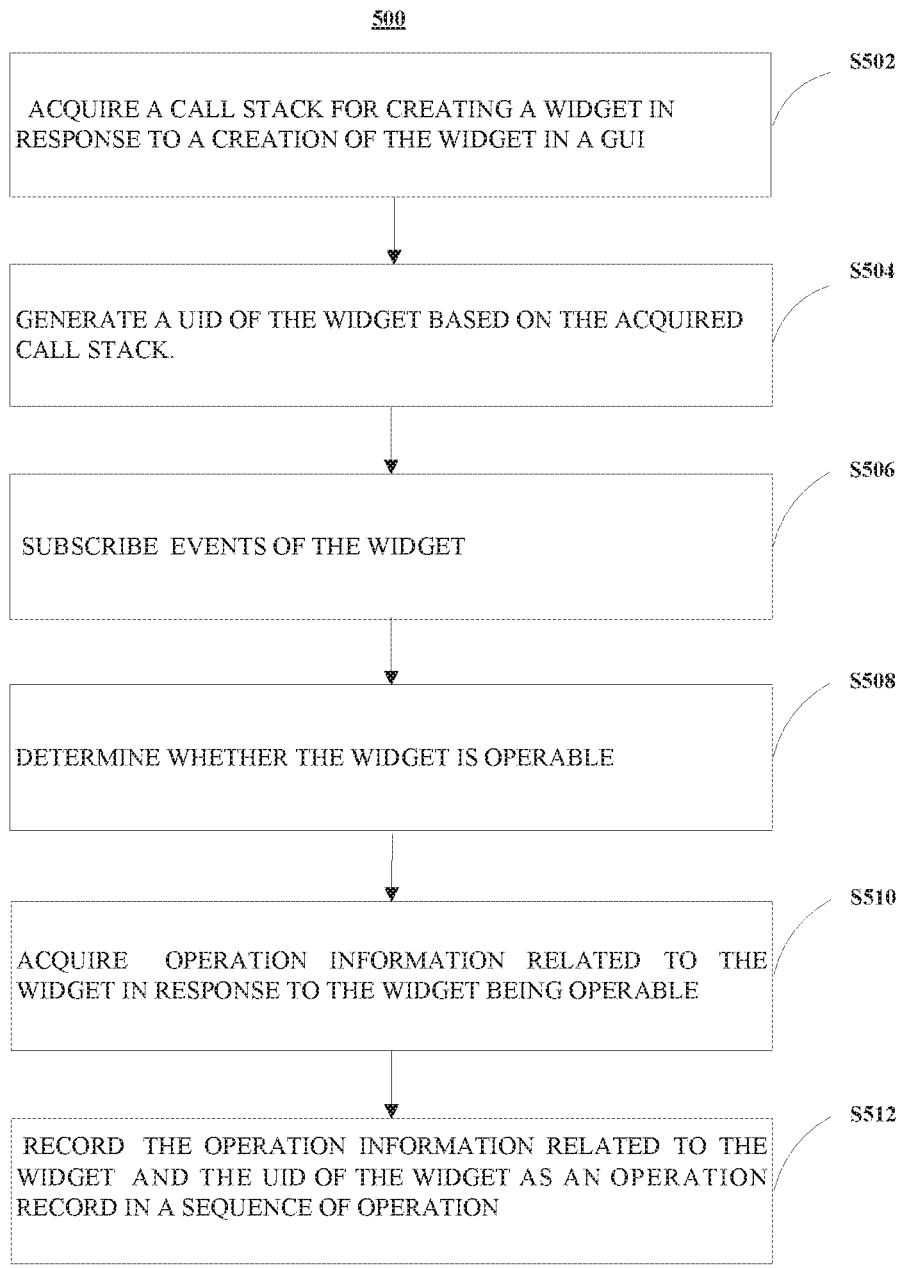
FIG. 5 depicts an example method for recording operations on a plurality of widgets in a graphical user interface according to an embodiment of the present invention.

The recording process:

FIG. 5 describes an example method 500 for recording an operation on a widget in a graphical user interface (GUI) according to an embodiment of the present disclosure. The method 500 can be implemented in the recording engine 402. The method 500 comprises S502-S512. For similarity, the method 500 describes how to record an operation on a widget.

At S502, in response to a creation of a widget in the GUI, a call stack for creating the widget is acquired. The GUI can include a plurality of widgets. Each widget of the plurality of widgets is a control element in the GUI. Each widget can facilitate a specific type of user-computer interaction, and appear as a visible part of an application that the GUI belongs to. Some widgets such as labels, buttons, dropdown menus, scroll bars and check boxes and the like can support an interaction with the user. Other widgets such as windows, panels, and tabs and the like can act as containers that group the widgets added to them. As known, a call stack is a stack data structure in which information about the active subroutines of a computer program is stored. The call stack is used to track a return address at which each active subroutine returns control back when finishing execution. Some GUIs can provide APIs (application programming interface) to monitor the creation of the widget. The APIs can be invoked to monitor the creation of the widget and to acquire the call stack for creating the widget. For example, a software application can use methods to create a widget. These methods can be hooked by a hooked code when the methods are invoked to create the widget. The hooked code can acquire the call stack for creating the widget. It shall be appreciated by those skilled in the art, a variety of hooking methods may be implemented to acquire the call stack for creating the widget.

At S504, a unique identification (UID) of the widget can be generated based on the acquired call stack. The UID of the widget is a unique identifier which can identify a widget. A generation rule for the UID of the widget can be predefined based on information related to the call stack for creating the widget by those who record the operation on the widget.

As the call stack is organized as a stack, a calling routine, which is a routine to call the above active subroutines to create the widget, can push the return address of the above active subroutines into the stack, and a called active subroutine, when it finishes, pulls or pops the return address off the call stack and transfers control to that address. The call stack is composed of stack frames. Each stack frame corresponds to a call to a subroutine which has not yet terminated with a return address. The stack frame at the top of the stack is for a routine being executed currently. An active subroutine is one that has been called but has not yet completed execution after which the control should be handed back to the return address. If, for example, a routine R1 calls a subroutine R2 multiple times from different places, R2 must know respective return addresses when completing respective executions. The stack frame usually includes at least the following items (in push order):

arguments (parameter values) passed to the called subroutine (if any);

the return address back to the calling routine (e.g. in the R2 stack frame, an address back to the routine R1); and space for the local variables of the calling routine (if any).

According to one embodiment of the present disclosure, the UID of the widget can be generated based on the arguments passed to the called subroutine, or the return address back to the calling routine, or both the arguments passed and the return address. A rule for generating a UID for a widget can be based on information related to the call stack for creating the widget. A method name, arguments, return address, or any combination of method name, arguments, return address may be used to generate a UID, provided that the UID generation technique generates a unique identifier for each widget.

At S506, events of the widget are subscribed. According to an embodiment, the recording engine 402 can create a recording object to subscribe the events of the widget. The creation of the recording object is not dependent on S502 and S504. According to an embodiment, the creation of the recording object can be in parallel with S502 and S504. For example, the recording object can be created in response to the creation of the widget in the GUI. According to other embodiments, the recording object can be created before or after S502 and S504. Those skilled in the art shall appreciate that a variety of methods may be implemented for creating the recording object to subscribe the events of the widget. According to one embodiment, the recording object can receive a notification when an event of the widget, for example button click event, occurs. In another embodiments, the recording engine 402 can subscribe the events of the widget in other ways, such as the recording engine 402 subscribes the events of the widget directly.

At S508, it is determined whether the widget is operable. At S510, in response to the widget being operable, operation information related to the widget are acquired. After the GUI is loaded and the widget can be operable, a user can make operations on the widget, for example, click a button or input parameters etc. According to an embodiment, since the recording object can subscribe the events of the widget, all operations made on the widget can be received by the recording object. The operation information related to the widget can be acquired from the recording object.

At S512, the operation information related to the widget and the UID of the widget are recorded as an operation record. A plurality of operation records may be recorded in sequence of operation. Once the recording engine 402 acquires operation information related to the widget, the recording engine 402 can record the operation information related to the widget and the UID of the widget as the operation record in sequence of operation in the storage 404. The operation information related to the widget may comprise an operation type on the widget, the sequence of the operation, parameters related to the operation (if any) and the like, wherein the sequence of operation can be determined according to the time when the operation on the widget occurs. For similarity, the method 500 describes how to record an operation on a widget. The method 500 can applied to record operations on at least one widget of the plurality of widgets. For at least one widget of a plurality of widgets in the GUI, an operation record corresponding to the at least one widget of the plurality of widgets can be generated. The generated at least one operation record can be saved in the storage 404 in a form of a file or a table in a database.

Figure 6:
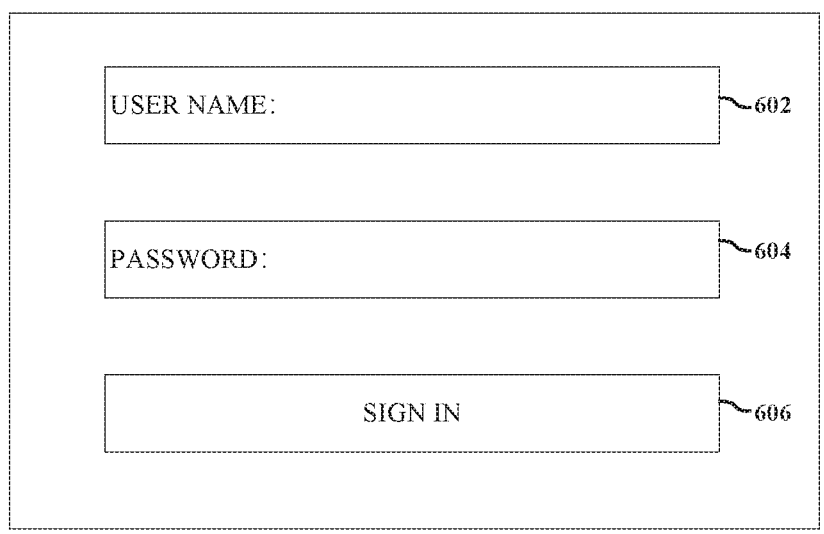
FIG. 6 depicts an example graphical user interface according to one embodiment of present disclosure.

FIG. 6 shows a simple example GUI according to one embodiment of present disclosure. There are three widgets in the GUI. The three widgets include a user name input box 602, a password input box 604 and a sign in button 606. Once the three widgets are created, call stacks for the three widgets can be acquired from the hooked code. For example, a call stack for the user name input box in Table 1 indicates an invoking relationship among the methods and also indicates return addresses of the methods. The invoking relationship among the methods indicates that a method "load- LoginPage" invokes a method "layoutWidgets", the method "layoutWidgets" invokes a method "createIDBox", and the method "createIDBox" invokes a method "_createWidget".

TABLE 1

| Method Name | Return Address |
| --- | --- |
| _createWidget | sample.js.jgz:127 |
| createIDBox | sample.js.jgz:1000 |
| layoutWidgets | sample.js.jgz:321 |
| loadLoginPage | sample.js.jgz.512 |

The UID of the widget can be generated based on the acquired call stack. A UID generation method can be implemented with an algorithm as long as the algorithm can make sure the generated UID of the widget is unique. According to one embodiment, the UIDs of each widget of three widgets can be generated based on a hash value of the method names and all the return addresses in the corresponding call stack. For example, Table 2 shows the three generated UIDs of the three widgets: "3Z9F45bqwrQ" for the user name input box 602, "aR56OPweWe" for the password input box 604, and "1cwUf6dveU" for the sign in button 606.

The UID of the widget can be generated based on the acquired call stack. A UID generation method may be implemented with any algorithm as long as the algorithm can make sure the generated UID of the widget is unique. According to one embodiment, the UIDs of each widget of three widgets can be generated based on a hash value of the method names and the return addresses in the corresponding call stack. For example, Table 2 shows the three generated UIDs of the three widgets: "3Z9F45bqwrQ" for the user name input box 602, "aR56OPweWe" for the password input box 604, and "1cwUf6dveU" for the sign in button 606.

TABLE 2

| Widget | UID |
| --- | --- |
| user name input box 602 | 3Z9F45bqwrQ |
| password input box 604 | aR56OPweWe |
| sign in button 606 | 1cwUf6dveU |

According to an embodiment, the recording engine 402 can create three recording objects to subscribe to the events of the three widgets respectively. As shown in Table 3, the record object 1 is created to record the events of the user name input box 602 with a UID "3Z9F45bqwrQ", the record object 2 is created to record the events of the password input box 604 with a UID "aR56OPweWe", and the record object 3 is created to record the events of the sign in button 606 with a UID "1cwUf6dveU". In this embodiment, the creation of the three operation records is not intended to limit the embodiments disclosed. Those in the art may understand that there are many solutions to record the operations on the widgets, for example, the recording engine 402 may record the operations on the widgets by itself directly.

TABLE 3

| Widget | UID | Record Object |
| --- | --- | --- |
| user name input box 602 | 3Z9F45bqwrQ | record object 1 |
| password input box 604 | aR56OPweWe | record object 2 |
| sign in button 606 | 1cwUf6dveU | record object 3 |

After the GUI shown in FIG. 6 is loaded in a browser with the RPA system 400 and the three widgets are operable, the user can make operations on the widgets. All those operations can be recorded automatically in the three record objects. For example, at first, the user inputs "administrator" in the user name input box 602. Then the user inputs "password" in the password input box 604. At last, the user click the sign in button 606. All operations made on the three widgets can be received by the respective recording objects. For example, the record object 1 can receive the "administrator" input operation. The record object 2 can receive the "password" input operation. The record object 3 can receive the click operation. The three record objects can acquire the operation information related to the corresponding widget. For example, the operation information related to the user name input box 602 includes an operation type "input" and an operation parameter "administrator". The operation information related to the password input box 604 includes the operation type "input" and an operation parameter "password". The operation information related to the sign in button 606 includes an operation type "click". Then the recording engine 402 can record operation information related to each widget and the UID of each widget as an operation record in sequence of operation. Table 4 shows an example table, in which the three operation records 1, 2, 3 are recorded in sequence of operation. The operation record 1 corresponding to the user name input box 602 includes an operation sequence "1", the UID of the user name input box 602 "3Z9F45bqwrQ", the operation type "input" and the operation parameter "administrator". The operation record 2 corresponding to the password input box 604 includes an operation sequence "2", the UID of the password input box 604 "aR56OPweWe", the operation type "input" and the operation parameter "password". The operation record 3 corresponding to the sign in button 606 includes an operation sequence "3", the UID of the sign in button 606 "1cwUf6dveU" and the operation type "click". The operation records in Table 4 is for purposes of illustration but are not intended to be exhaustive or limited to the embodiments disclosed. Those in the art should understand that the operation records can also be saved in a form of a file such as XML file or other data structures.

TABLE 4

| Operation Record | Operation Sequence | UID of the Widget | Operation Type | Operation Parameter |
| --- | --- | --- | --- | --- |
| 1 | 1 | 3Z9F45bqwrQ | input | "administrator" |
| 2 | 2 | aR56OPweWe | input | "password" |
| 3 | 3 | 1cwUf6dveU | click | |

Figure 7:
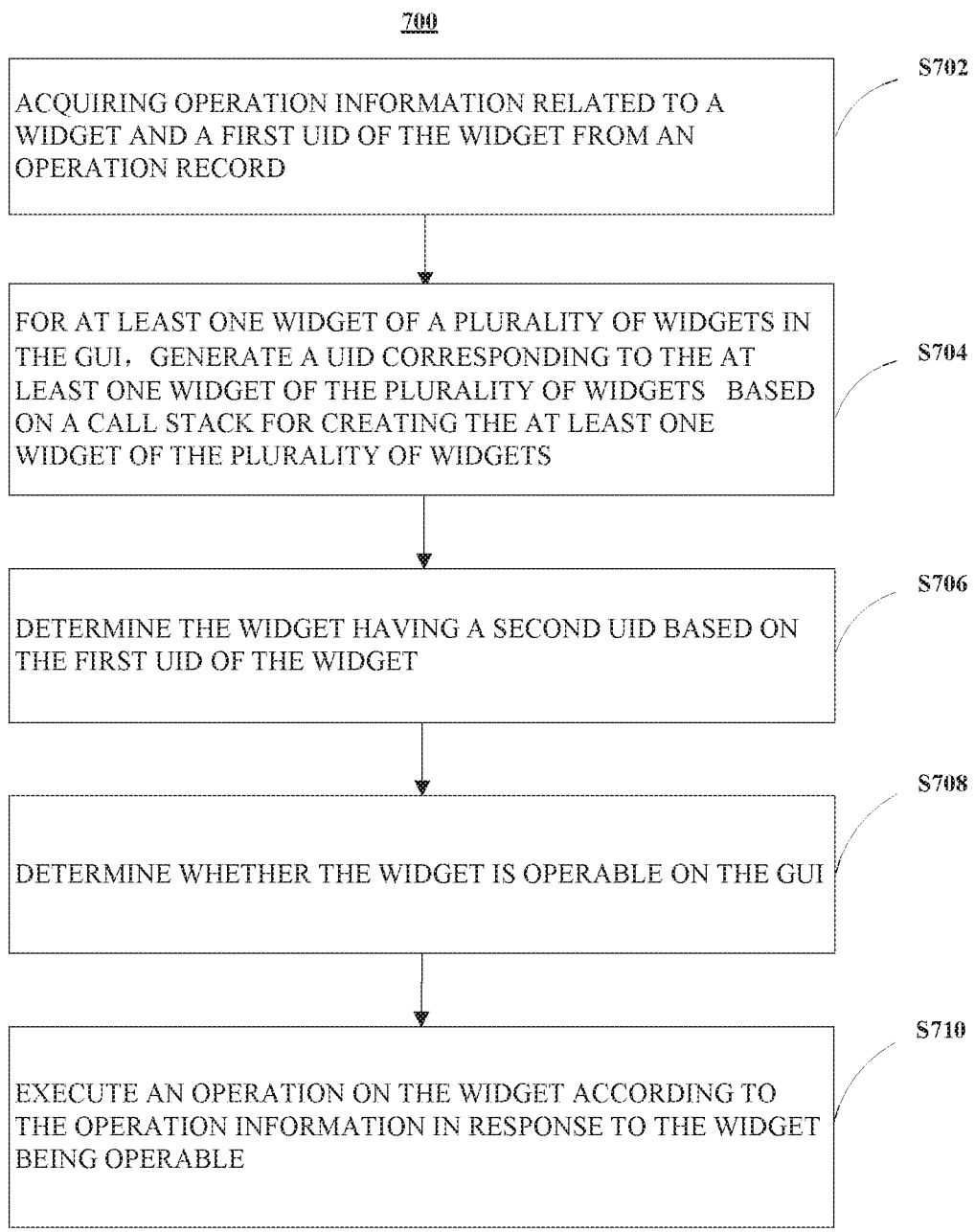
FIG. 7 depicts an example method for replaying an operation on a widget in a graphical user interface according to an embodiment of the present invention.

The replaying process:

FIG. 7 describes an example method 700 for replaying operations on a plurality of widgets in a GUI according to an embodiment of the present invention. The method 700 can be implemented in the replaying engine 403. The method 700 comprises S702-S710. For similarity, the method 700 describes how to replay an operation on a widget.

At S702, operation information related to a widget and a UID of a widget can be acquired from an operation record generated during the recording process. The UID for the widget may be referred to as the first UID of the first widget. As noted above, operation records may be saved during the recording process in the storage 404 in form of a file or a table. In a replaying process, e.g., the method 700, the operation record can be acquired at S702 from a file or table, such as Table 4 saved in the storage 404.

At S704, for at least one widget of a plurality of widgets in a GUI, a UID corresponding to at least one widget of the plurality of widgets is generated based on a call stack for creating the at least one widget of the plurality of widgets. For example, assume the GUI shown in FIG. 6 has been created or rendered, UIDs for each of the widgets 602, 604, and 606 may be generated based on the call stacks for creating the respective widgets 602, 604, and 606.

At S706, a widget is determined or selected from the plurality of widgets in the created GUI based on the first UID of the widget. The UID of the determined or selected widget may be referred to as a second UID. The second UID is the same as the first UID. A technical problem of locating a particular widget among a plurality of widgets is solved by the widget having a unique identifier, and the second UID being the same as the first UID.

At S708, it may, in some embodiments, be determined whether the widget is operable on the GUI. Sometimes a widget that is visible will be disabled or otherwise not functional. In these cases, even though the widget has been rendered, it is not operable, i.e., the widget is not capable of executing an operation. In one embodiment, an input may be applied to a widget and a result of applying the input monitored to determine whether the widget is operable.

At S710, an operation, e.g., a replay operation, on the widget can be executed according to the operation information. S710 may be in response to the widget being operable, although this condition is not required. It should be noted that the generation of the second UID at S704 is not dependent on S702. According to an embodiment, the generation of the second UID at S704 can be parallel with S702. According to an embodiment, the second UID at S704 can be generated before or after S702.

According to an embodiment, the generating the second UID for each widget of the plurality of widgets in the GUI comprises: the call stack for creating each widget of the plurality of widgets in the GUI is acquired in response to each widget of the plurality of widgets being created in the GUI during the replaying process, and the second UID for each widget of the plurality of widgets in the GUI is generated based on the acquired call stack during the replaying process.

According to an embodiment, the first UID of the widget is generated based on the call stack for creating the widget in the GUI during a recording process in which operations on a plurality of widgets in the GUI are recorded. The recording process has been described in detail here before. The generation of the first UID comprises the following actions. First, the call stack for creating the widget in the GUI is acquired in response to the widget being created in the GUI during the recording process. Second, the first UID is generated based on the acquired call stack during the recording process. Those skilled in the art may understand that the call stack for creating the widget in the GUI during the recording process is the same as the call stack for creating the widget in the GUI during the replay process due to replaying operations on the same widget in the GUI of the same software application. As the same UID generation method is adopted during the recording process and the replay process, the first UID of the widget is the same as the second UID of the widget.

According to an embodiment, the operation record is created during the recording process. The creation of the operation record further comprises the following actions. At first, events of the widget are subscribed. Then operation information related to the widget is acquired in response to the widget being operable. At last, the operation information related to the widget and the first UID of the widget are recorded as the operation record.

According to an embodiment, it may be determined whether the widget is operable in the GUI, which may comprise: determining whether the widget is visible in the GUI, then it is determining whether the widget is operable in the GUI in response to the widget being visible. According to an embodiment, the executing an operation on the widget according to the operation information related to the widget further comprises the following actions. First, a replaying object to refer to the widget is created. Then, the replaying object is instructed to execute the operation on the widget according to the operation information related to the widget.

Figure 8:
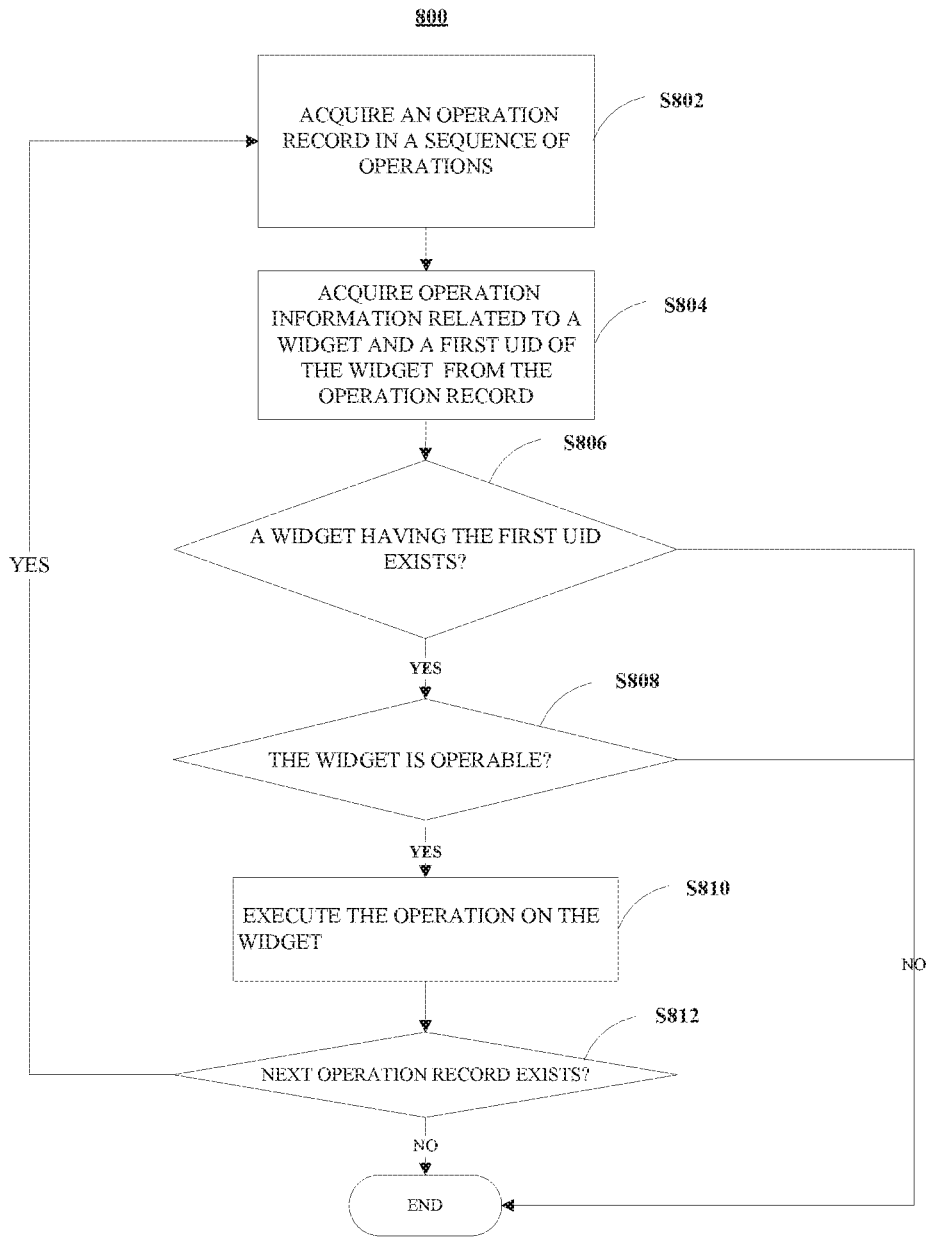
FIG. 8 depicts an example flow chart for replaying a plurality of operations on a plurality of widgets in a graphical user interface according to an embodiment of the present invention.

FIG. 8 describes an example flow chart of process 800 for replaying operations on a plurality of widgets in a GUI according to an embodiment of the present invention.

At S802, an operation record in sequence of operation is acquired. For example, operations on the three widgets in the GUI shown in FIG. 6 recorded during the recording process are to be replayed in a browser with the RPA system 400. At S802, one of the operation records 1, 2 and 3 can be acquired from Table 4 according to the replay sequence of operations.

At S804, operation information related to a widget and a first UID of the widget can be acquired from the acquired operation record. For example, the operation record 1 can be acquired from Table 4, the operation record 1 containing: operation type "input," operation parameter "administrator," and the UID of the Widget "3Z9F45bqwrQ."

At S806, it is determined whether a widget having the first UID exists, e.g., a widget having the first UID was created during the replay process. After the GUI is loaded in a browser with the RPA system 400, for at least one widget of a plurality of widgets in the GUI, a UID corresponding to the at least one widget of the plurality of widgets is generated based on a call stack for creating the at least one widget of the plurality of widgets. According to an embodiment, a mapping relationship between a created widget and its corresponding UID can be recorded in, for example, a data structure or a file document, e.g., Table 5 described below. It may be checked whether the first UID can be found in the data structure or the file document recording the mapping relationship between the plurality of widgets in the GUI and the respective UIDs. If the check result is YES, it means the widget having the first UID can be retrieved from the plurality of widgets in the GUI, then the process 800 may go to S808. If the check result is NO, it means a widget having the first UID does not exist, then the process 800 go to the end.

Herein, the UID corresponding to the at least one widget of the plurality of widgets is generated based on a call stack for creating the at least one widget of the plurality of widgets. The generation of the UID corresponding to the at least one widget of the plurality of widgets may comprise the following actions. First, in response to a creation of the at least one widget of the plurality of widgets in the GUI, a call stack for creating the at least one widget of the plurality of widgets during the replaying process can be acquired. Second, the UID corresponding to the at least one widget of the plurality of widgets can be generated based on the acquired call stack. For at least one widget of the plurality of widgets in the GUI, the UID generation method adopted in the replaying process is the same as that in the recording process, e.g., S504. The details of the UID generation method for a widget may refer to S504, which is not repeated herein. So for the same widget, the corresponding UID generated during the replaying process should be the same as the first UID generated during the recording process.

At S808, it may be determined, in some embodiments, whether the widget is operable. According to an embodiment, the replaying engine 403 can create a replaying object to refer to the widget. The replaying object can check the status of the widget. If the check result indicates that the widget is operable, then the process 800 may go to S810. In fact, it is possible that the widget may be inoperable when it is checked for the first time. So, in some embodiments, the replaying object may check multiple times until the widget is operable. If the widget is still inoperable after being checked at least once or, in some embodiments, a predetermined number of times, e.g., 5 or 10 times, then the process 800 is ended.

At S810, if the widget is operable, the operation, e.g., a replay operation, on the widget can be executed according to the operation information related to the widget. According an embodiment, the replaying object can call method(s) or function(s) related to the operation of the widget. After the replaying object completes the operation on the widget, the replaying engine 403 can get a response from the replaying object. Then the replaying engine 403 may check whether there is a next operation record in the storage 404. If the check result is YES, then the process 800 may go back to S802 and repeat the whole process 800. If the check result is NO, it means all operation records have been processed, then the process 800 may be ended.

According to one embodiment of present disclosure, after the GUI is loaded in a browser with the RPA system 400, the replaying engine 403 can replay operations on the GUI shown in FIG. 6. There are three widgets shown in the GUI. The three widgets include the user name input box 602, the password input box 604 and the sign in button 606. After the three widgets were created, the call stacks for the three widgets can be acquired from the hooked code. The UIDs of the three widgets can be generated based on the respective call stacks. Since the UI generation method adopted in the replaying process is the same as that in the recording process, each of the UIDs generated in the replaying process is the same as that generated in the recording process. For example, Table 5 shows the generated UIDs of the three widgets 602, 604 and 606 in the replaying process. It can be seen that the generated UIDs of the three widgets 602, 604 and 606 in the replaying process in Table 5 are the same as those generated in the recording process in Table 2.

TABLE 5

| Widget | UID |
| --- | --- |
| user name input box 602 | 3Z9F45bqwrQ |
| password input box 604 | aR56OPweWe |
| sign in button 606 | 1cwUf6dveU |

The replaying engine 403 can read the three operation records in Table 4 in sequence of operation. The operation information related to each widget and the UID of each widget can be acquired from each operation record. For example, at first, the operation record 1 can be read from Table 4. The operation type "input" and the operation parameter "administrator" as well as the UID of the Widget "3Z9F45bqwrQ" can be acquired from the operation record 1. Then the replaying engine 403 may check if any widget having the UID "3Z9F45bqwrQ" can be retrieved in Table 5 using the UID "3Z9F45bqwrQ" acquired from the operation record 1. In this case, the user name input box 602 can be retrieved to be the widget having the UID "3Z9F45bqwrQ". Then, the replaying engine 403 may create replaying object 1 to refer to the user name input box 602, as shown in Table 6. The replaying object 1 can check the status of the user name input box 602. If the check result indicates that the user name input box 602 can be operable, then the replaying object 1 can input "administrator" into the user name input box 602. After completion of the input operation, the replaying object 1 may return a response to the replaying engine 403.

TABLE 6

| Widget | Replay Object | UID |
| --- | --- | --- |
| user name input box 602 | replay object 1 | 3Z9F45bqwrQ |
| password input box 604 | replay object 2 | aR56OPweWe |
| sign in button 606 | replay object 3 | 1cwUf6dveU |

Then, the replaying engine 403 may check whether there is a next operation record to be processed in Table 4. In the following, the operation record 2 can be read from Table 4 in sequence of operation. The replaying process for the operation record 2 is similar to that for the operation record 1 described above. The operation type "input" and the operation parameter "password" as well as the UID of the Widget "aR56OPweWe" can be acquired from the operation record 2. Next, the password input box 604 can be retrieved to be the widget having the UID "aR56OPweWe". Then the replaying engine 403 may create replaying object 2 to refer to the password input box 604, as shown in Table 6. The replaying object 2 can check the status of the password input box 604. If the check result indicates that the password input box 604 can be operable, then the replaying object 1 can input "password" into the password input box 604. After completion of the input operation, the replaying object 2 may return a response to the replaying engine 403. At last, the operation record 3 can be read from Table 4. The operation type "click" and the UID of the Widget "1cwUf6dveU" can be acquired from the operation record 3. Next, the sign in button 606 can be retrieved to be the widget having the UID "1cwUf6dveU". Then, the replaying engine 403 may create replaying object 3 to refer to the sign in button 606, as shown in Table 6. The replaying object 3 can check the status of the sign in button 606. If the check result indicates that the sign in button 606 can be operable, then the replaying object 3 can click the sign in button 606. After completion of the click operation, the replaying engine 403 can get a response from the replaying object 3. The whole replaying process is ended after all operation records have been processed. In above embodiment, the creation of the three replaying objects for replaying the operations on the three widgets is only illustrated, but are not intended to limit the embodiments disclosed. Those in the art may understand that there are many solutions to execute the operations on the widgets. For example, the replaying engine 403 may read each operation record and execute each corresponding operation by itself.

The present invention may be a system, a method, and/or a computer program product at any possible technical detail level of integration. The computer program product may include a computer readable storage medium (or media) having computer readable program instructions thereon to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a or of a general purpose computer, special purpose computer, or other programmable data processing apparatus to produce a machine, such that the instructions, which execute via the or of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for replaying operations in a graphical user interface (GUI) comprising:

acquiring, by one or more processors, an operation record created during a recording process, the operating record including operation information related to a widget in the GUI recorded during the recording process and a first unique identification (UID) of the widget;

generating for at least one widget of a plurality of widgets in the GUI, by the one or more processors, a UID corresponding to the at least one widget of the plurality of widgets, wherein the UID is based on a call stack for creating the at least one widget of the plurality of widgets, the call stack including an argument and a return address;

determining from the generated at least one UID corresponding to the at least one widget of the plurality of widgets, by the one or more processors, a widget in the plurality of widgets in the GUI having a second UID, wherein the second UID is the same as the first UID; and replaying the operations by executing, by the one or more processors, an operation on the widget according to the operation information related to the widget, wherein the operation information related to the widget comprises an operation type on the widget and parameters related to the operation.

2. The method of claim 1, wherein the generating the UID corresponding to the at least one widget of the plurality of widgets comprises:

acquiring, by the one or more processors, the call stack for creating the at least one widget of the plurality of widgets in response to the at least one widget of the plurality of widgets being created in the GUI during the replaying process; and generating, by the one or more processors, the UID corresponding to the at least one widget of the plurality of widgets using a hash algorithm based on the argument and the return address in the acquired call stack during the replaying process.

3. The method of claim 1, wherein the first UID of the widget is generated based on an argument and a return address in a call stack for creating the widget in the GUI during the recording process by actions of:

acquiring, by the one or more processors, the call stack for creating the widget in the GUI in response to the widget being created in the GUI during the recording process; and generating, by the one or more processors, the first UID of the widget using a hash algorithm based on an argument and a return address in the acquired call stack during the recording process.

4. The method of claim 1, wherein the operation record is created during a recording process by actions of:

subscribing, by the one or more processors, events of the widget;

acquiring, by the one or more processors, the operation information related to the widget in response to the widget being operable; and recording, by the one or more processors, the operation information related to the widget and the first UID of the widget as the operation record.

5. The method of claim 1, further comprising determining whether the widget is operable in the GUI by:

determining, by the one or more processors, whether the widget is visible in the GUI; and determining, by the one or more processors, whether the widget is capable of executing an operation in the GUI in response to the widget being visible.

6. The method of claim 1, wherein the executing the operation on the widget according to the operation information related to the widget comprises:

creating, by the one or more processors, an object to refer to the widget; and instructing, by the one or more processors, the object to execute the operation on the widget according to the operation information related to the widget.

7. The method of claim 1, wherein the operation on the widget according to the operation information related to the widget is executed in response to the widget being operable.

8. A computer-implemented method for recording an operation on a widget in a graphical user interface (GUI), comprising:

acquiring, by one or more processors, a call stack for creating the widget, wherein the call stack is acquired in response to creation of the widget in the GUI;

generating, by the one or more processors, a unique identification (UID) of the widget based on the acquired call stack, wherein the call stack includes an argument and a return address;

subscribing, by the one or more processors, events of the widget;

acquiring, by the one or more processors, operation information related to the widget, wherein the operation information includes an event of the widget; and saving, by the one or more processors, the operation information related to the widget and the UID of the widget are in operation record in a storage device, wherein the operation information related to the widget comprises an operation type on the widget and parameters related to the operation.

* * * * *